United States Patent
An (12)

(10) Patent No.: US 6,416,878 B2
(45) Date of Patent: Jul. 9, 2002

(54) ABRASIVE DRESSING TOOL AND METHOD FOR MANUFACTURING THE TOOL

(75) Inventor: Jung Soo An, Seoul (KR)

(73) Assignee: Ehwa Diamond Ind. Co., Ltd., Kyongki-do (JP)

( * ) Notice: Subject to any disclaimer, the term of this patent is extended or adjusted under 35 U.S.C. 154(b) by 0 days.

(21) Appl. No.: 09/780,121

(22) Filed: Feb. 9, 2001

(30) Foreign Application Priority Data

Feb. 10, 2000 (KR) .......................................... 2000-6252

(51) Int. Cl.⁷ .............................................. B32B 15/00
(52) U.S. Cl. .............................. 428/565; 51/307; 419/8
(58) Field of Search ............... 419/8; 51/307; 428/565

(56) References Cited

U.S. PATENT DOCUMENTS 3,894,673 A     7/1975  Lowder et al.
4,968,326 A  * 11/1990  Wiand ............................ 51/293
5,492,771 A  *  2/1996  Lowder et al. ............. 428/565
6,102,024 A  *  8/2000  Buljan et al. ............. 125/16.02

* cited by examiner

*Primary Examiner*—Ngoclan Mai
(74) *Attorney, Agent, or Firm*—Vidas,Arrett&Steinkraus PA

(57) ABSTRACT

The present invention relates to an abrasive dressing tool used for mechanical and chemical planarization abrasion of the surface of the work pieces as can be used for semiconductor wafers or the like which require precise, planar and micro polishing, and a method for manufacturing the same dressing tool. Specifically, ultimately macro- and micro-scratches on wafers can be drastically reduced, the rate of inferior finished products or wafers can be decreased and abrasive life time of the tool can be prolonged, by sintering and brazing abrasive particles with a nickel based brazing metal on the abrasive tool, and then filling or covering the non-sintered parts and re-crystallized parts of sintered and brazed layers, apt to crack or fall-out from the surface, through electroplating process.

7 Claims, 2 Drawing Sheets

ABRASIVE DRESSING TOOL AND METHOD FOR MANUFACTURING THE TOOL

FIELD OF THE INVENTION

Figure 1:
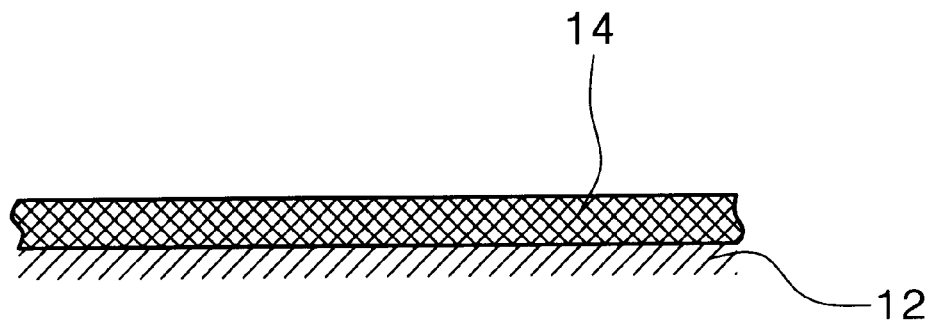

The present invention relates to an abrasive dressing tool used for mechanical and chemical planarization abrasion of the surface of the work pieces as can be used for semiconductor wafers or the like which require precise, planar and micro polishing, and a method for manufacturing the same dressing tool. Specifically, it relates to an abrasive dressing tool and a method for manufacturing the same dressing tool, wherein ultimately micro-scratches on wafers can be drastically reduced, the rate of inferior finished products or wafers can be decreased and abrasive life time of the tool can be prolonged, by sintering and brazing diamond particles with a nickel based brazing metal on the abrasive tool and then filling or covering the non-sintered parts and re-crystallized parts of sintered and brazed layers through electroplating process.

The semiconductor industry keeps increasing its pace of development and particularly, intensive research is being concentrated on the high integration of circuits. In order to increase the rate of production in terms of the chips per unit area, multi-layered arrangement of circuits is required, which in turn is recognized to need an extensive planarization polishing of wafers as an essential process. This process is called Chemical Mechanical Planarization or CMP.

The CMP process is the process in which the circuits on wafers are subjected to planarization polishing while the wafers are rotated under a fixed pressure, with polishing pads supplied with slurry solution (polishing solution). The polishing pads used in that process are generally polyurethane-based plastic having a number of micro-pores to retain slurry solution, so that a predetermined polishing efficiency (rate of material removal) and uniform polishing may be attained.

In continuous polishing operations, however, the micro-pores on polishing pads are plugged with polishing residues due to high pressure and rotation, with the result that the polishing pads lose the original function of retaining slurry solution and so uniform polishing efficiency is not attained.

Thus, in order to cope with the plugging of micro-pores on polishing pads, there is employed a conditioning operation in which so-called conditioners consisting of stainless- or nickel plates with diamond particles fixed on them are used to micro-abrade the surface of pads for developing or forming new micro-pores.

These conditioners are classified as the metal-brazed conditioners which comprise the diamond particles fixed on stainless plates, obtained by arranging diamond particles in a mono-layer on the plates and sintering them together with mixed metal powder under a high temperature to fix the diamond, with a part of the diamond covered by brazed metals, and as the electroplated conditioners comprising diamond particles fixed on the plates by means of electroplating.

However, these two types of products have their relative disadvantages.

In the case of metal brazed conditioners, for example, the conditioners as disclosed in the U.S. Pat. No. 3,894,673, which are obtained by high temperature sintering through use of nickel-based brazing birder, are excellent in their holding force compared to the electroplated conditioners and have a good polishing effect mainly due to many chip pockets. However, because the diamond suffers from thermal damage over 800° C., the metal components are apt to fail to reach a high-temperature sintering under complete fusion, causing unsatisfactory sintered quality. Consequently the surface of conditioners is rough and a part of the metal remains unvaryingly in the form of particles, so that metal components on metal brazed conditioners are easily broken or fallen out during abrasive dressing operation, ultimately causing micro-scratches or contamination on wafers due to the coarse particles containing or contaminated polishing pads in a CMP process.

Because in comparison with the size of the polishing particles contained in the polishing slurry solution is in the order of nanometers, the size of the metal particles fallen out from conditioner tools are tens to hundreds times that size, a serious damage by micro-scratches can be inflicted on the circuits on wafers.

On the other hand, the disadvantage of the electroplated conditioners lies in that as the bonding between the electroplated nickel layer and the diamond particles is a kind of mechanical bonding by van der Waals force which is not large enough to hold strong the diamond particles, the risk of falling-out for the diamond particles is very high, whereby the life time of conditioners is relatively short. Another drawback with these conditioners is the low polishing efficiency owing to the lack of chip pockets, which serve as channels for discharging polishing residues.

SUMMARY OF THE INVENTION

The prevention of causing scratches on wafers in a CMP process and extending the polishing life time of conditioners are becoming an important issue, because of the current trend of scaling-up of wafers to the diameter of more than 300 mm for high integrated wafers like over 256 mega DRAM in the semiconductor industry. Therefore, there is an urgent demand for an abrasive dressing tool which can satisfy not only the requirement of prolonging the abrasive life time through the improvement in the force for holding diamond particles but also the requirement of recovering high yield of chips from wafers through the decrease in micro-scratch generation and concurrent inferiority rate.

The present invention seeks to resolve the problems with prior art and so is intended to sinter and braze diamond particles with nickel-based metal for strong bonding force, so that the diamond particles may be free of the risk of falling-out.

Simultaneously, the present invention is intended to reduce micro-scratches drastically by freeing particles from the rise of falling-out during an abrasive work through the process of filling or covering non-sintered parts and re-crystallized parts on the rough sintered surface by using electroplating process.

Thus, the object of the invention is to provide an abrasive dressing tool and a method for manufacturing the same tool wherein the rate of inferior polished products is reduced and the life time of the dressing tool is enhanced.

In conventional metal-brazed conditioner products, binding force is derived from carbides formed by chemical reaction between the diamond particles and the metal components including chromium or silicone. Therefore, the force for holding diamond particles is strong enough to ensure the long life time of conditioners, while the conditioners are associated with the drawback of causing scratches owing to falling-out of particles. In contrast, the electroplated products have smooth and neat surface so as to cause less scratches on wafers but have shorter service life.

In other words, the respective conventional conditioners were insufficient in that they have only one advantage. The products according to the invention, however, ensures the safety and long life time due to the prevention of falling-out for diamond particles and the high productivity due to the maximized decrease in scratch generation by provision of the both advantages as described above based on the double metal layers of the metal brazed layer and the electroplated layer.

Another object of the invention is to further increase the life time of conditioners by choosing the metal components of electroplated layers depending on the instance of application of the conditioners. As a practical example, the layers on wafers to be polished comprise sometime tungsten in a CMP process. In that case, a strong acid with pH of 2 to 4 is usually used as the slurry solution in polishing and therefore the conditioners can have the problem of abrupt decrease in life time because of the dissolution of sintered metal layers in contact with residual acid. In such a case, coating with the electroplated layer comprising the metal rhodium as a chemical resisting metal component can extend the life time of conditioners by two times that of conventional ones. It is one of major characteristics of the invention that an optimum conditioning effect in CMP process can be realized by adjusting the components of plated layers to a specific purpose, as illustrated in the above.

The above objects are achieved according to one aspect of the invention by a method for manufacturing an abrasive dressing tool, which comprises the steps of (1) coating the slurry solution of a brazing metal binder on a metal substrate to the desired thickness; (2) distributing super abrasive, cubic boron nitride or diamond particles in a predetermined amount on the slurry solution of (1); (3) heating the metal substrate of (2) as a whole in a hydrogen furnace or vacuum furnace at a sintering temperature between 700 to 1300° C. depending on the kind of the metal binder used to fuse and fix the brazing binder so as to form a metal sintered layer; and (4) conducting electroplated coating only on the surface of sintered metal layer in order to fill or cover the rough parts and the non-sintered or recrystallized parts possibly to fall-out, those parts being present on the surface of sintered metal layer of (3).

The above objects are also achieved according to another aspect of the invention by an abrasive dressing tool usable for providing planarization polished surfaces requiring a high clarity like semiconductors, which comprises a metal substrate with a desired shape; a sintered metal layer formed on the metal substrate, the sintered metal layer being formed by mutual binding through sintering and brazing between uniformly distributed super abrasive, cubic boron nitride (CBN) or diamond particles and the nickel-based brazing metal; and an electroolated layer formed only on those parts except the exposed surface of super abrasive, cubic boron nitride(CBN) or diamond particles, out of the surface of sintered metal layer, the electroplated layer being formed by an electroplating process in order to fill or cover the non-sintered or re-crystallized parts present on the sintered metal layer.

BRIEF DESCRIPTION OF THE INVENTION

Figure 2:
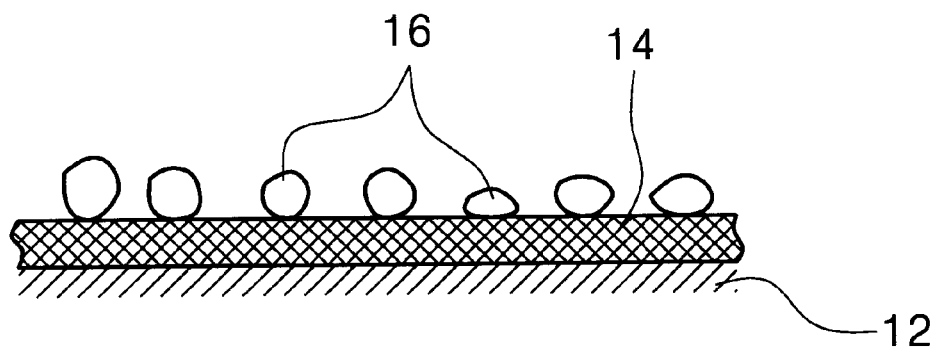
Figure 3:
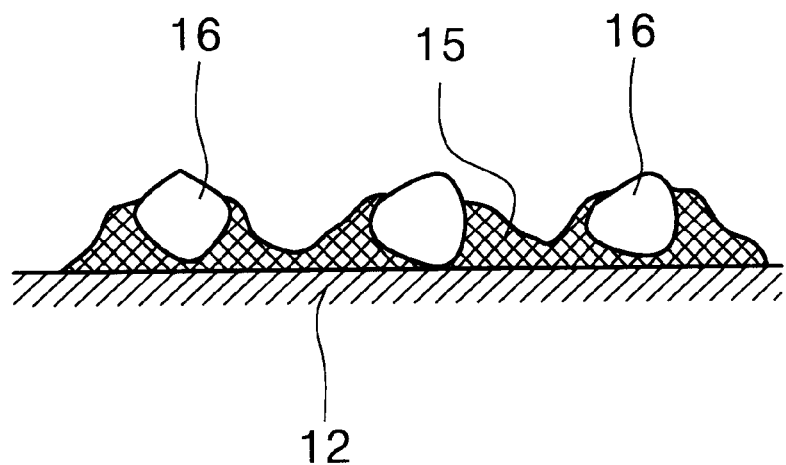
Figure 4:
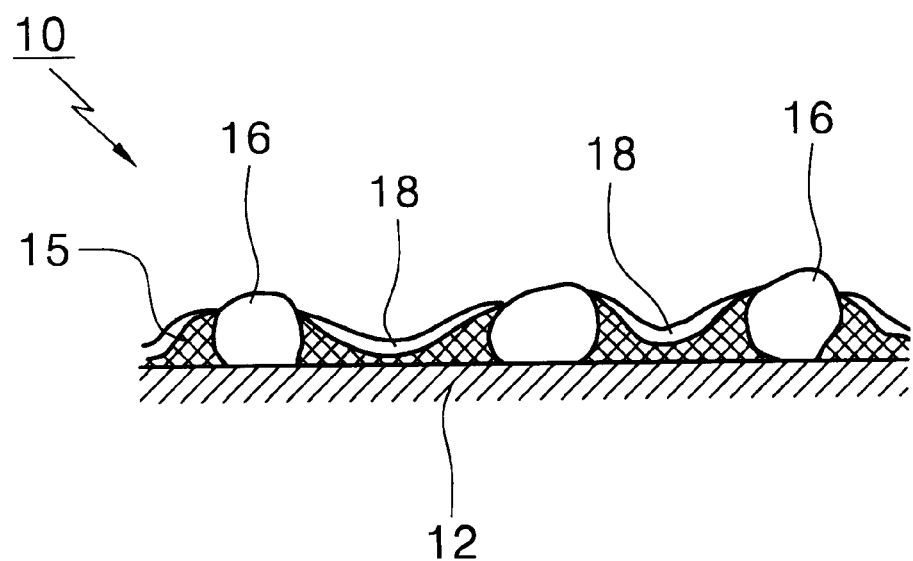

FIG. 1 shows an enlarged view for illustrating coating a slurry solution of brazing metal binder on a metal substrate in a desired thickness as the first step of the process for manufacturing an abrasive dressing tool, FIG. 2 shows an enlarged view for illustrating the state after uniformly distributing diamond particles following the first step shown in FIG. 1, FIG. 3 shows an enlarged view for illustrating the state after wintering, with parts of diamond particles exposed and parts enclosed by sintered metal layers, and FIG. 4 shows an enlarged view for illustrating the state after electroplating, with the surface of sintered metal layer, except the exposed areas of diamond particles, coated with electroplated layer.

DETAILED DESCRIPTION OF THE INVENTION

Preferred embodiment of the invention will be described in detail below with reference to relevant drawings.

In FIG. 3, the state of the conditioner according to the invention after it has been subjected to the sintering process using nickel-based brazing binder 15 is illustrated. The interfaces of diamond particles 16 with the surrounding metal binder 15 have strong adherence due to the chemical reaction. Accordingly, the diamond particles on the conditioner have high stability without falling out during abrasion work. The chip pockets formed on the sintered layer contribute to high abrasive efficiency by allowing smooth discharge of abrasive residues through them. At this stage, there still remain the problem that irregular surfaces of metal binders 15 and incompletely-or non-sintered particles may have the possibility of falling out on polishing pads and then being transferred to wafers to cause micro-scratches on the wafers.

To solve the problem and maintain, the inherent advantage, electroplated layers 18 are formed on, the surface of binder layer 15. Then, the rough surfaces of binder layer 15 and non-sintered particles can be covered by electroplated layer 18 to result in a smooth and neat surface of abrasive dressing tool.

The original abrasive function of the diamond particles can be kept intact by preventing the exposed surfaces of diamond particles from being electroplated. If the coating layer covers the diamond, a risk of peeling-off of coated layer during an abrasive operation exists and further the sharp edges of diamond particles are dulled by the coating to cause the reduction in abrasion performance. In the present invention, the plating condition is so controlled that the exposed surfaces of diamond particles may not be electroplated but only the surfaces of metal binder layer may be formed with an electroplated coating. The advantage of durability or long life for the metal brazed conditioner and the advantage of causing less scratches on wafers through the prevention of particles from falling-out are realized in combination with each other in one conditioner according to the invention by providing the one conditioner with two kinds of layers, i.e. the metal brazed layer and the electroplated layer. Consequently, the risk of particles falling-out from conditioner during CMP process can be eliminated, generation of micro-scratches can be reduced and long life time of conditioners can realized, whereby the proportion of inferior wafer products following a CMP process is reduced and productivity of CMP is elevated.

Referring back to FIG. 4, the enlarged partial cross section for an abrasive dressing tool 10 according to the invention is illustrated in FIG. 4.

The abrasive dressing tool 10 is provided with a metal substrate 12 in a desired form and a sintered metal layer 15 which is formed by sintering and brazing of nickel-based brazing metal, with uniformly distributed diamond particles taking part in the process through chemical reactions. On the surface of sintered metal layer 15, the rest part excepting the exposed surface of the diamond is covered with electroplated coating 18. That is, a part of diamond particles 16 is exposed on the sintered metal layer 15.

The sintered metal layer 15 comprises silicon carbide (SiC), chromium carbide ($Cr_3C_2$) and the like formed by chemical reactions at a predetermined temperature between the diamond particles 16 and the nickel-based brazing metal binder slurry solution 14 as depicted in FIGS. 1 and 2.

The electroplated coating layer 18 is the layer formed on the sintered metal layer 15 to fill in the unfilled parts and the gaps between the diamond particles and the sintered brazing metal layer 15.

Thus, according to the invention, the formation of microscratches on wafers can be remarkably reduced by prepreparatory measure for abrasive conditioners, consisting of filling and enclosing the non-sintered parts or easy-to-fallout parts and the re-crystallized parts or easy-to-crack parts through electroplating process.

The abrasive action through use of an abrasive dressing pad 10 can be started with the diamond particles 16 from the beginning, because the surfaces of sintered metal layer 15 are only coated with the electroplated layer 18 and the exposed surfaces of diamond particles 16 remain uncovered and active.

On the other hand, as the abrasive particles, instead of the diamond particles, the super abrasives such as carbide-based alloys including silicon carbide (SiC), tungsten carbide (WC) or cubic boron nitride (CBN) particles may be used.

In the following, the examples of methods for manufacturing abrasive dressing tools according to the invention and comparative examples will be described.

EXAMPLE 1

First, prepare a metal substrate 12 in the shape to manufacture. In this example, a substrate of stainless steel strong in corrosion resistance is used.

Brazing metal slurry solution 14 is coated on the metal substrate 12 in a desired thickness. The coating thickness of the metal slurry solution varies depending to the thickness after the process of sintering and brazing, wherein preferably the thickness of the sintered and brazed layer at the positions enclosing diamond particles amounts to 50% to 80% of the average diameter of diamond particles used.

For instance, when the diamond particles with the size of 100/120 mesh corresponding to the average particle size of about 140 micrometers are used, the thickness of sintered layer at locations surrounding diamond particles is chosen to be about 70 to 110 micrometers.

The brazing metal slurry solution 14 comprises at least 60 wt. % of nickel as the main component, and as the additional components, respective 5 wt. % to 15 wt. % of one or more metals chosen from the group of chromium, silicone, cobalt, tungsten, tungsten carbide and boron.

As a subsequent step, the diamond particles 16 are uniformly distributed in a required amount in the coated slurry solution 14 on the metal substrate 12.

When uniform distribution of the particles 16 has been completed in the slurry solution 14, the assembly is dried in a drying oven at the drying temperature maintained at about 100° C. for the period of 10 to 30 minutes.

After completion of drying, the assembly as semi-product tool is heated in a vacuum furnace, an inert gas furnace under argon atmosphere free of oxygen, or a hydrogen furnace at a predetermined sintering temperature of 700 to 1300° C. depending on the composition of the brazing metal slurry solution used to fuse, set and sinter the metal slurry 14. The sintering condition so chosen is to prevent oxidation.

When the sintering step is completed, there is formed a sintered metal layer 15 as shown in FIG. 3, including carbides produced from the chemical reactions between the parts of the element carbon of diamond particles and the elements silicone, chromium and so on of nickel-based brazing metals.

The strong bonding force of carbides act to anchor the diamond particles 16 via the sintered metal layer 15 to the metal substrate 12.

Next, in preparation for electroplated process, the tool in its semi-product stage is washed with water or acids to remove impurities from its surface.

Following the washing step, the electroplating is conducted to dispose of non-sintered parts (parts easy to fallout) and re-crystallized parts (parts easy to crack) generated during sintering.

The electroplating process is conducted in such a manner that the tools still in the stage of semi-products are applied with a preset electric voltage and current in an appropriate electrolytic solution in a plating bath until the desired thickness a plated coating layer 18 is formed on a sintered metal layer 15.

While the voltage and current are adjusted to attain the desired coating thickness for a certain plating time, in most cases the time varies between approximately 30 minutes and 3 hours depending on the desired thickness.

As hinted before, most preferably, the thickness of the electroplated layer may be 30% to 60% of the average diameter of the diamond particles.

The above-described electrolytic solution or plating solution includes a metal element or an alloy of two or more elements selected from the group consisting of nickel, copper, chromium, tungsten, tungsten carbide, cadmium, titanium, silicon, platinum, gold, tin, ruthenium, rhodium, palladium, silver, zinc, molybdenum and zirconium.

As the electroplating proceeds, defective sites on the surface of brazing metal layer are mended by nickel ions, for example, wherein the unfilled parts of the surface and the gaps between diamond particles 16 and the brazing metals are filled or covered by nickel. Therefore, smooth surface and stable particles are obtained.

The abrasive dressing tools 10 which have been plated are washed and inspected before they can be used as finished products for CMP processes or the like.

This manufacturing method is not restricted to the case of diamond, but applicable to other super abrasives such as carbide-based alloys including silicon carbide (SiC), tungsten carbide (WC) or cubic boron nitride (CBN) particles.

EXAMPLE 2

This second example relates to the condition of electroplating process intended to increase the binding force of the sintered layer with electroplated layer, or indirectly to prevent the diamond from being plated.

The binding force between the sintered layer and the electroplated layer can be increased by using nickel of nickel-based electrolyte as the electroplating solution on the ground that the principal component of sintering metals is nickel in these tests.

In particular, the electroplating composition comprising 150 g/l of nickel sulfate, 150 g/l of ammonium chloride and 15 g/l of boric acid was used. The electroplating temperature was 40° C. to 50° C. As the result, the electroplated coating did not take place on the surface of diamond particles and only on the surfaces of metal brazed layer there were formed electroplated coatings.

The thickness of electroplated coating was controlled by the current density and electroplating time, wherein the thickness could be adjusted at around 10 $\mu$m to 100 $\mu$m.

EXAMPLE 3

This third example illustrates an electroplating condition different from the previous one.

For the purpose of increasing the hardness of plated coating through densification of the surface of plated layer, the gloss nickel plating solution (Watts Solution) was used.

The composition of the gloss nickel plating solution used comprised 280 g/l of nickel sulfate, 50 g/l of nickel chloride, 40 g/l of boric acid and additionally some amount of leveler as well as brightener.

As the result of test, the plated crystals were fine with the size of less than 0.1 $\mu$m and structurally dense and tight so that the hardness of the surface of electroplated layer was very high. As is evident, the high hardness of the coating is advantageous, because it means the improved resistance to the wear.

EXAMPLE 4

This example describes another electroplating process.

The electroplating solution used in this test was a kind of nickel sulfamate solution which included nickel sulfate at the concentration of 195 g/l, cobalt sulfate at 35 g/l, sodium chloride at 15 g/l and boric acid at 40 g/l. In this case, the element cobalt acted as a hardener to result in increased surface hardness.

EXAMPLE 5

The present fifth example illustrates an electroplating process under a different condition.

In some CMP processes, polishing slurry with pH of 2 to 4, a strong acid, is used. As the diamond particles on conditioners are not to fall out due to the dissolving of the brazing metal layer in the strong acid in these cases, it is advisable to incorporate anti-chemical components in the electroplated coating layer.

As one example, plating with rhodium may be employed. A rhodium composition comprising 4 g/l of metal rhodium (sulfate bath), 80 ml/l of sulfuric acid, and 30 g/l of ammonium sulfate was used and as the result, chemically stable and anticorrosive coating was attained and the wear resistance was excellent as well with the Vickers hardness (Hv) at the order of 800 Hv to 1000 Hv.

The results of evaluation when the present invention was applied to practical CMP processes are as follows.

The evaluation condition was such that an Auriga Machine from SpeedFam Co. was used as the CMP machine and 8 inch wafers were about 3000 Å polished before they were measured for micro-scratches.

As seen in the following Table 1, the conditioner product C according to the invention produced through the process of both sintering/brazing and electroplating is remarkably excellent in the respect of micro-scratches, the inferiority rate, and the life time in comparison to the conditioner product A produced only through sintering/brazing and the conditioner product B produced only through electroplating. Particularly, the product A with only metal-brazed layer but without electroplated layer exhibited the rough surface after the sintering step and showed falling out of some surface particles during conditioning operation so that the generation of scratches increased to more than two times of that for the present invention.

The results of conditioning test with the inventive product C conducted at a CMP line of another semiconductor company by using a Mirra equipment as the CMP machine are listed in Table 1 for comparison and evaluation.

As seen in the table, by the polished amount of about 5000 Å on the surface of wafers in CMP process, for the comparative conditioner A, about 100 micro-scratches per each wafer were measured as compared with the case of the inventive product C, in which only average 50 or less micro-scratches per each wafer were counted. Therefore, the present invention could reduce the generation rate of micro-scratches by about 50% or more. As for the life time, the inventive product C could stand in active service for about 90 hours, while the comparative product B could serve for the duration of average 50 hours. This means the improvement in the life time for the case of the present invention by about 80% based on that of comparative B.

TABLE 1

| Conditioner products for evaluation | | | Surface state | Chip pocket | Micro-scratch | Life time of conditioner | Comparative evaluation |
|---|---|---|---|---|---|---|---|
| Comparative Product | A | Brazed conditioner | Rough Surface | present | Average 100 ea/wafer | 70 hrs | Bad |
| | B | Electroplated conditioner | Smooth surface | Not Present | Average 65 ea/wafer | 50 hrs | Bad |
| Present product | C | Brazed/Electroplated conditioner | Smooth surface | present | Average 50 ea/wafer | 90 hrs | Good |

As described above, the present invention has the advantages of reducing the generation of micro-scratches on wafers in abrasive operation, decreasing the rate of inferior products and increasing the yield of semiconductor chips by sintering and brazing the nickel-based metals to improve the holding force of diamond particles and subsequently electroplating the surface of sintered layer to prevent the falling-out of brazed metal particles during abrasion of polishing pads to thereby subsequently suppress the generation of micro-scratches.

Furthermore, he present invention has the economic advantage because it can bring about the reduction in the cost for manufacturing semiconductor chips and other processing cost mainly due to the enhanced life time of tools, which exceeds two times that of the conventional electroplated products.

What is claimed is:

1. A method for manufacturing an abrasive dressing tool, which comprises the steps of:
    (1) coating the slurry solution of a brazing metal binder on a metal substrate to the desired thickness;
    (2) distributing super abrasive, cubic boron nitride or diamond particles in a predetermined amount on the slurry solution of (1);
    (3) heating the metal substrate of (2) as a whole in a hydrogen furnace or vacuum furnace at a sintering temperature between 700 to 1300° C. depending on the kind of the metal binder used to fuse and fix the brazing binder so as to form a metal sintered layer; and
    (4) conducting electroplated coating only on the surface of sintered metal layer in order to fill or cover the rough parts and the non-sintered or re-crystallized parts possibly to fall-out, those parts being present on the surface of sintered metal layer of (3).

2. The method according to claim 1, wherein the coating thickness of the slurry solution of a brazing metal binder is adjusted, so that the thickness of the sintered metal layer may amount to 50% to 80% of the average diameter of the abrasive particles.

3. The method according to claim 1, wherein the electroplated layer includes a metal element or an alloy of two or more elements selected from the group consisting of nickel, cobalt, copper, chromium, tungsten, tungsten carbide, titanium, ruthenium, rhodium, palladium, molybdenum and zirconium.

4. An abrasive dressing tool usable for providing planarization polished surfaces requiring a high clarity like semiconductors, which comprises
- a metal substrate (12) with a desired shape;
- a sintered metal layer (16) formed on the metal substrate (12), the sintered metal layer being formed by mutual binding through sintering and brazing between uniformly distributed super abrasive, cubic boron nitride (CBN) or diamond particles and the nickel-based brazing metal; and
- an electroplated layer (18) formed only on those parts except the exposed surface of super abrasive, cubic boron nitride (CBN) or diamond particles, out of the surface of sintered metal layer (15), the electroplated layer being formed by an electroplating process in order to fill or cover the non-sintered or re-crystallized parts present on the sintered metal layer.

5. The abrasive dressing tool according to claim 4, wherein the electroplated layer includes a metal element or an alloy of two or more elements selected from the group consisting of nickel, cobalt, copper, chromium, tungsten, tungsten carbide, titanium, ruthenium, rhodium, palladium, molybdenum and zirconium.

6. The abrasive dressing tool according to claim 4, wherein on the sintered metal layer (15) a part of super abrasives particles such as cubic boron nitride (CBN) or diamond particles are exposed.

7. The abrasive dressing tool according to claim 4, wherein the thickness of the electroplated layer 18 amounts to about 30% to 60% of the average diameter of abrasive particles.

* * * * *

UNITED STATES PATENT AND TRADEMARK OFFICE
CERTIFICATE OF CORRECTION

PATENT NO.    : 6,416,878 B2
DATED         : July 9, 2002
INVENTOR(S)   : Jung Soo An It is certified that error appears in the above-identified patent and that said Letters Patent is hereby corrected as shown below:

<u>Title page,</u>
Item [73], delete "Kyongki-do (JP)" and insert -- Kyongki-do (KR) --

Signed and Sealed this

Twenty-seventh Day of August, 2002

*Attest:*

*Attesting Officer*

JAMES E. ROGAN
*Director of the United States Patent and Trademark Office*